3,725,287
POLYSILOXANE COMPOSITION USEFUL AS
A BRAKE FLUID
Frank J. Traver, Troy, N.Y., assignor to
General Electric Company
No Drawing. Filed Apr. 8, 1971, Ser. No. 132,556
Int. Cl. C09k 3/00
U.S. Cl. 252—78                              5 Claims

ABSTRACT OF THE DISCLOSURE

A siloxane polymer useful as a brake fluid comprising a polymer of the structure,

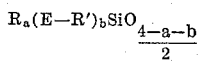

where R is a monovalent hydrocarbon radical or a halogenated monovalent hydrocarbon radical, R' is a divalent hydrocarbon radical which may be straight or branched chained, E is selected from the group consisting of $-NH_2$,

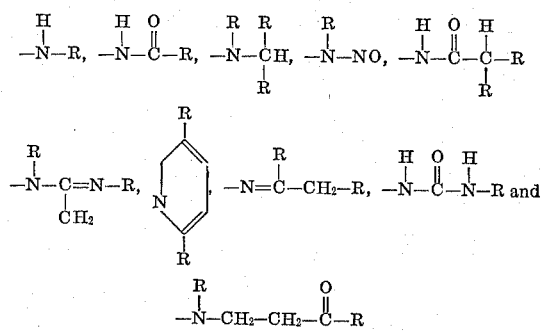

where R is as defined previously and the different R radicals can be the same or different, where $a$ varies from 1.11 to 2.02, $b$ varies from 0.023 to 1.00 and the sum of $a$ plus $b$ varies from 2.024 to 3.00. The present invention also comprises a brake fluid system using the above polysiloxane polymer as the brake fluid.

BACKGROUND OF THE INVENTION

This invention relates to polysiloxane polymers and, in particular, this invention relates to amine polysiloxane polymers useful as brake fluids.

It is desirable that a fluid which is to be used as a brake fluid meet certain performance criteria, as well as certain suggested criteria for safety purposes, that is, the brake fluid must be such so that the brakes will operate efficiently and failure of the brakes will not result. These criteria must be met if the brake fluid is to be incorporated into new automobiles or if it is to be sold in the market in containers as brake fluid to be used on automobiles. The suggested criteria which a brake fluid must meet encompass an original equilibrium reflux boiling point determination, a wet equilibrium reflux boiling point determination, flash point determination, kinematic viscosity determination, pH value, brake fluid stability which encompasses high temperature stability and chemical stability, a corrosion determination, evaporation determination, water tolerance determination at low temperatures and at 60° C., compatibility determination at low temperatures, a resistance to oxidation determination, effects on rubber determination and stroking property determination. The original equilibrium reflux boiling point determination is desired in order to determine that the brake fluid have a sufficiently high boiling temperature so that it will not boil at operating temperatures to which the brake fluid is subjected through the normal operation of the vehicle. It can easily be seen that if the equilibrium reflux boiling point is too low, that the vaporized brake fluid would easily rupture the brake hoses, resulting in failure of the brakes. Further, the brakes would not operate with vapor in the hydraulic lines.

A wet equilibrium boiling point is desired so as to test whether the inclusion of a certain amount of water in the brake fluid would result in the formation of vapor in the normal operating temperatures of the brake fluid, which would cause the rupture of the brake lines and result in failure of the brakes.

A flash point test is necessary to determine whether the brake fluid has a sufficiently high flash point. If the brake fluid does not have a sufficiently high flash point, it will start burning at the normal operating temperature of the brakes. It is also desirable in this respect to test the fire point and the autogenous ignition temperature. For instance, if the fire point is close enough to the flash point under normal operating conditions when the flash point of the brake fluid is exceeded, the brake fluid might continue burning and would thus not only result in failure of the brakes but cause the automobile to burst into flames. In accordance with this reasoning, it is also desirable to consider the autogenous ignition temperature, for if this temperature is not considerably higher than the flash point, it can be seen that again, under operating conditions when the flash point of the fluid is exceeded and in that case if the autogenous ignition temperature of the fluid is also exceeded, the brake fluid might burn so quickly that not only will the brakes fail, but the occupant of the automobile will not have time to leave the automobile before a major fire ensues.

A kinematic viscosity test is necessary to determine whether the brake fluid will have sufficiently low viscosity at very low temperatures and a sufficiently minimum viscosity at high temperatures so that the brakes will be in acceptable operating condition at these extreme temperatures.

A pH test is used to determine the pH of the brake fluid such that it is not acidic or too basic so that it will corrode and eat away the hydraulic lines or the hydraulic brake drum cylinders in which the fluid is located.

A high temperature stability test is necessary to determine the stability of a fluid at high temperatures so that it will not degrade at the specified temperatures to other compounds or products which would be unworkable fluids for a brake system.

A chemical stability test is needed to determine whether if the brake fluid is mixed with a glycol brand brake fluid it will not react with this fluid.

A corrosion test, as with the pH test, is needed to determine whether the brake fluid would eat away the metal in the hydraulic lines or the rubber in the brake drum cylinders or the rubber that may form part of the hydraulic lines and thus cause early failure of the brakes.

An evaporation test is needed to determine whether the brake fluid will evaporate at certain high temperatures and thus not only form undesirable vapor in the brake lines but further will result in the dissipation of the brake fluid through the hydraulic lines and master cylinder into the atmosphere so that it would need constant replacement. Excessive vapor in the hydraulic lines will cause brake failure.

A water tolerance test at low temperatures is needed to determine whether the fluid with the water it would pick up from the atmosphere would result in the water crystallizing out to form ice at low temperatures, which ice would impair the performance of the brakes.

A water tolerance test at high temperatures is needed to determine whether the water which is picked up by the fluid from the atmosphere would evaporate at the high temperature and form vapor in the brake lines which would impair the performance of the brakes.

A compatibility test is needed to determine at both low and high temperatures whether the brake fluid would operate properly when it is mixed with glycol-based brake fluid and result in impairment of the performance of the brakes. This test is needed because it frequently becomes necessary to replace part of the brake fluid in an automobile with additional fluid so it is desirable for any new brake fluid which is admitted to the market to be compatible with glycol-based brake fluids.

A resistance to oxidation test is necessary in order to determine whether the brake fluid will oxidize in the presence of the oxygen in the air to form different products which would be unsuitable as brake fluid components.

A stroking properties test is necessary in order that the fluid can be tested in a simulated operation that would be comparable to the use of the fluid in an automobile and thus determine the performance of the brake fluid over an extended period of time so that it may be determined that the brake fluid tested does not have any unforeseen effects which will degrade the brake hydraulic system or result in failure of the brakes.

At the present time, there are no brake fluids presently on the market which pass all of the above tests with acceptable overall performance.. The desirable specifications or ratings in the above suggested tests required the fluid to have a higher equilibrium reflux boiling temperature and flash point than of the presently available glycol-based fluids.

The brake fluids presently on the market are basically polyether glycols which vary from case to case, depending on the type of polyether units and the number of polyether units in the polymer chain. Such brake fluids are hygroscopic in that they will pick up large quantities of water from the atmosphere. Problems are associated with the packaging and handling of such brake fluids since unless extreme precautions are exercised, these brake fluids will pick up large amounts of water from the atmosphere due to their hygroscopicity which will result in a brake fluid with poor performance characteristics, as well as a brake fluid that is unsafe because it can cause failure of the brakes. It is undesirable to have excess water, since it will separate out at low temperatures such as —40° F., in that the water will form ice crystals and may cause the brake drum cylinder to freeze, thus causing failure of the brakes. Further, it is undesirable to have large amounts of water in the brake fluid in that at the high temperatures, which are commonly present in the operation of automobile brakes, the water will evaporate to form vapor which may rupture the hydraulic lines causing failure of the brakes and possibly cause the brake fluid to burst into flames or the vapor may cause a very sluggish, inefficient braking action.

It is thus desirable to have a brake fluid on the market which picks up a minimum amount of water through hygroscopicity and which is compatible with the amount of water it picks up from the atmosphere so that when the brake fluid is subjected to temperatures as low as —40° F., brake failure does not result. The brake fluids which meet the above test are disclosed in the present case as well as in the applications of Frank J. Traver's Ser. Nos. 125,396, 125,397, and 125,398.

Accordingly, it is one object of the present invention to provide a polysiloxane polymer useful as a brake fluid which meets the highest standards and conditions for automobile brake fluids.

It is another object of the present invention to provide an amine polysiloxane useful as hydraulic fluid for a central hydraulic system.

It is yet another object of the present invention to provide a process for producing an amine polysiloxane useful as a brake fluid.

It is an additional object of the present invention to provide a brake fluid which is only slightly hygroscopic and is compatible with the water that it picks up from the atmosphere such that the water will not separate either at low temperature or high temperature from the brake fluid mass.

It is yet another aim of the present invention to provide a polysiloxane polymer useful as a brake fluid which has a high flash point, fire point and autogenous condition temperature which far exceeds those of the brake fluids presently on the market.

SUMMARY OF THE INVENTION

In accordance with the present invention, there is provided a brake fluid system comprising brake drum cylinders, a master cylinder, hydraulic lines connecting the brake drum cylinders to the master cylinder where said hydraulic lines and brake drum cylinders, as well as the master cylinders, are substantially filled wth a polysiloxane polymer of the structure, (1) 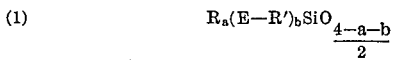

where R is a monovalent hydrocarbon radical or a halogenated monovalent hydrocarbon radical, R' is a divalent hydrocarbon radical, E is selected from the group consisting of —NH$_2$,

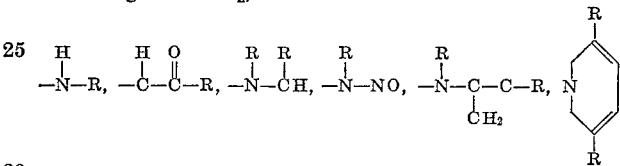

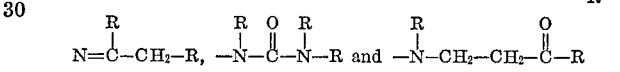

where R is as defined previously and the different R radicals are the same or different, where $a$ varies from 1.1 to 2.02, $b$ varies from 0.023 to 1.00, and the sum of $a$ plub $b$ varies from 2.024 to 3.00. More specifically, R' is selected from alkylene or arylene radicals of up to 20 carbon atoms and R is preferably an alkyl radical such as methyl. Further, more preferably, $a$ varies from 1.23 to 2.05, $b$ varies from 0.055 to 0.92 and the sum of $a$ plus $b$ varies from 2.074 to 2.5. This nitrogen-containing polysiloxane polymer is obtained by equilibrating or cyclic alkylpolysiloxane with a disiloxane chain-stopper in the presence of a basic catalyst so as to obtain a polysiloxane and then, if desired, reacting the polysiloxane having therein primary or secondary amine groups with other compounds.

DESCRIPTION OF THE PREFERRED EMBODIMENT

The radicals R and R' appearing in Formula 1 are well known in the art and are typified by radicals usually associated with silicon-bonded organic groups in the case of R, and are generally associated with divalent hydrocarbon radicals in the case of R'.

The organic radicals represented by R include monovalent hydrocarbon radicals, halogenated monovalent hydrocarbon radicals and cyanoalkyl radicals. Thus, the radical R may be alkyl, such as methyl, ethyl, propyl, butyl, octyl; aryl radicals, such as phenyl, tolyl, xylyl, naphthyl radicals; aralkyl radicals, such as benzyl, phenylethyl radicals: olefinically unsaturated monovalent hydrocarbon radicals, such as vinyl, allyl, cyclohexyl radicals; cycloalkyl radicals, such as cyclohexyl, cycloheptyl radicals; halogenated monovalent hydrocarbon radicals, such as chloromethyl, dichloropropyl, 1,1,1 - trifluoropropyl, chlorophenyl, dibromophenyl and other such radicals; cyanoalkyl radicals, such as cyanoethyl, cyanopropyl, etc. Preferably, the radicals represented by R have less than 8 carbon atoms and, in particular, it is preferred that R be methyl, ethyl or phenyl. The different R radicals in the compounds of Formula 1 may be the same or different. The radicals represented by R' may be any alkylene or arylene radicals of less than 20 carbon atoms, such as methylene, ethylene, various isomers of the phenylene radicals or substituted phenylene radicals. In the preferred embodiment, R' is propylene. Further, R' can be alkylene, arylene, alkenylene, as well as alkynylene.

The preferred structural formula which comes within the average unit formula as set forth in Formula 1 is as follows:

(2) 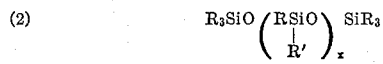

In this formula, R is preferably methyl and $x$ varies from 1 to 10.

Another preferred structural formula coming within the average unit Formula 1 is, (3) 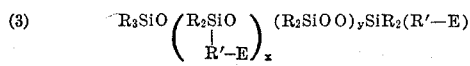

where R is preferably methyl, $x$ varies from 1 to 10 and $y$ varies from 1 to 15.

The compound of Formula 1 may also have the structural formula as follows:

(4) $(E—R')R_2SiO(R_2SiO)_{x+y}SiR_2(R'—E)$ where R, R' $x$ and $y$ have the meanings and values indicated above. The most preferred compounds that are useful as brake fluids coming within the scope of Formulas 1, 2 and 3 are as follows:

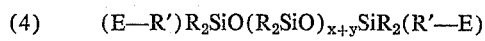

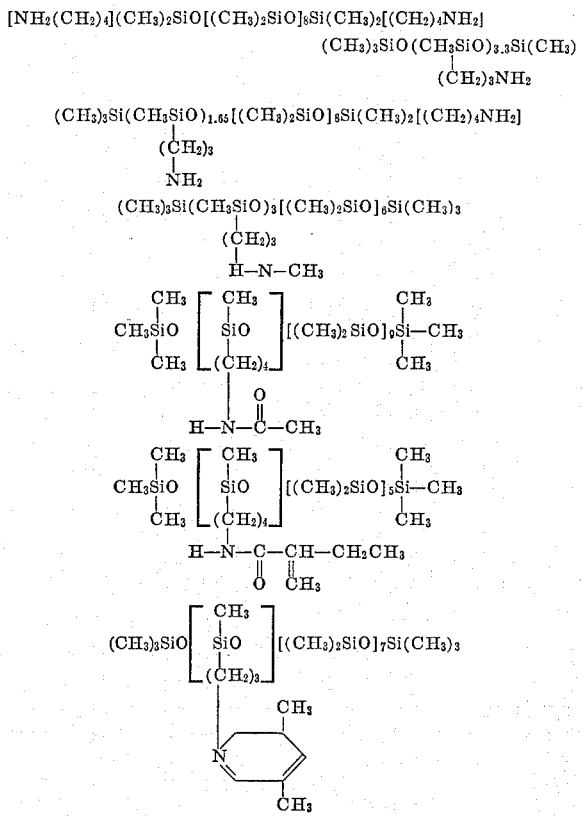

One method for forming the compounds of Formula 1 comprises the reaction of a compound of the formula $$CH_2=CHR^3Cl$$

with a hydrogenpolysiloxane, where $R^3$ is a divalent hydrocarbon radical of up to 20 carbon atoms. The reaction is preferably carried out at room temperature in the presence of an inert solvent, such as benzene, toluene, xylene and mineral spirits.

The olefinic chloride is reacted with a hydrogenpolysiloxane of the formula, (5) 

in the presence of a platinum catalyst, where R has the meaning defined previously and $a$ varies from 1.11 to 2.02, $b$ varies from 0.023 to 1.00 and the sum of $a$ plus $b$ varies from 2.024 to 3.00. Preferably in the above formula, $a$ varies from 1.23 to 2.05, $b$ varies from 0.055 to 0.92 and the sum of $a$ plus $b$ varies from 2.074 to 2.5. The hydrogenpolysiloxane is added to the reaction pot and heated to a temperature in the range of 100° C. to 150° C. to remove any free water and toluene is then added to the reaction pot. The mixture is heated to a temperature in the range of 100° to 150° C. to remove any free water by toluene-water azeotrope. Once the solution of the hydrogenpolysiloxane and the toluene is dried in accordance with the azeotrope technique, a trace of platinum catalyst is added to the mixture. Then the olefinic chloride is slowly added to the reaction pot. The addition is exothermic so the temperature is controlled by the olefin addition rate and is usually maintained in the range of 25° to 75° C. During the reaction, the SiH peak disappearance is followed by infrared scan. Once the addition of the olefin to the polysiloxane is completed, the solution is filtered through fuller's earth to remove any precipitates. Then the solution is stripped to remove solvents and low boiling fractions to yield the desired chloropolysiloxane. By the rate of the addition of the olefin, the temperature is able to be controlled in the range of 25° to 100° C. and, more preferably, in the range of 25° to 75° C.

A suitable catalyst for addition of organohydrogenpolysiloxane to the olefinic chloride are the various platinum and platinum compound catalysts known in the art. These catalysts include elemental platinum in the finely divided state which can be deposited on charcoal or alumina, as well as various platinum compounds such as chloroplatinic acid, the platinum hydrocarbon complex of the type shown in U.S. Pats. 3,159,601 and 3,159,662, as well as the platinum alcoholic complexes prepared from chloroplatinic acid which are described and claimed in Lamoreaux U.S. Pat. 3,220,972. Preferably, the platinum catalyst is added to the organohydrogenpolysiloxane located in the reaction chamber to which is also added a solvent and then the olefin is slowly added to the reaction mixture at the reaction temperatures described above. Whether elemental platinum or one of the platinum complex catalysts is used, the catalyst is generally used in amounts sufficient to provide about $10^{-4}$ to $10^{-6}$ moles of platinum per mole of the olefinic chloride reactant. As mentioned previously, the reaction is effected by adding the hydrogenpolysiloxane to an inert solvent such as inert solvents being selected from the group of benzene, toluene, xylene, mineral spirits and other inert solvents. The reaction mixture is preferably heated to 25° C. to 75° C. before the addition of the olefinic chloride. The olefinic chloride is then added to the hydrogenpolysiloxane solvent mixture at an addition rate so as to maintain the reaction temperature in the range of 25° C. to 75° C. during the reaction. Preferably, the reaction is allowed to proceed to completion in 4 to 15 hours and preferably in 5 to 8 hours. After the reaction period is over, a sample of the reaction mixture may be checked by infrared analysis for SiH bonds to determine how far the reaction has proceeded to completion. When at least 95% of the SiH organopolysiloxane has been converted to the reaction product, the reaction mixture may be cooled and the reaction may be considered to have proceeded to a sufficient extent for the conversion of the chloropolysiloxane.

The chloropolysiloxane product has the structure, (6) 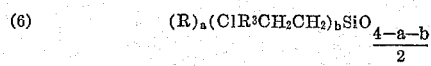

where R, $R^3$, $a$, and $b$ are as previously defined. To obtain the desired amine, the above product is simply reacted with ammonia. The reaction is preferably carried out at room temperature within the range of 25° C. to 100° C. for a period of 1 to 5 hours to obtain one of these desired products coming within the scope of Formula 1 and having the structure, (7)    $(R)_a(NH_2R^3CH_2CH_2)_bSiO_{\frac{4-a-b}{2}}$ where R, $R^3$, $a$ and $b$ are as defined previously.

Another method for forming the amine products of Formula 7 is to react an olefinic chloride having the formula $CH_2=CHR^3Cl$ with cuprous cyanide to form $CH_2=CHR^3CN$. The reaction is preferably carried out at room temperature in the presence of an inert solvent, such as benzene, toluene, xylene, and mineral spirits. The olefinic cyanide is then reacted with the hydrogenpolysiloxane in an SiH-olefin addition reaction in the presence of the catalyst system disclosed in Bluestein U.S. Pat. 2,971,970 which is made part of the present disclosure, in the presence of a platinum catalyst.

The Bluestein catalyst system comprises a mixture of a cuprous compound selected from the class consisting of cuprous halides and cuprous oxide and a diamine having the formula, $R^4(R^5)N(CH_2)_mN(R^5)_2$ wherein $m$ is an integer from 1 to 6, inclusive, $R^4$ is a lower alkyl radical and $R^5$ is a member selected from the class consisting of hydrogen, lower alkyl radicals, aminoalkyl radicals, alkylaminoalkyl radicals and dialkylaminoalkyl radicals. In addition to these two components there is a third component in the catalyst system that is a trialkylamine. In carry ing out the reaction, the olefinic nitrile, the silicon hydride and the catalyst system are merely added to a suitable reaction vessel and maintained at a desired temperature for sufficient time to effect the reaction. The time required for effecting the reaction varies greatly, depending upon the particular reactant, the particular catalyst system employed and the temperature of the reaction. Of the various olefinic nitriles employed in the practice of this process, the fastest reaction rate is observed with acrylonitrile. As the acrylonitrile becomes more substituted, the reaction rate decreases. The reaction rate is also a function of whether the two-component catalyst system or the three-component catalyst system is employed. Reactions involving the three-component system of the diamine, the trialkylamine and the cuprous compound are generally faster than the reaction involved with the catalyst system which does not contain the trialkylamine.

The amount of catalyst composition employed in relation to the monohydrolyzable polysiloxane and the olefinic nitrile may again vary within extremely wide limits. As is the case with most catalytic reactions, the rate of reaction increases as the catalyst concentration increases, and although no critical catalyst concentrations have been discovered, for economic reasons it is preferred to employ, on the basis of total moles of hydrolyzable silicon hydride and olefinic nitrile, at least 0.2 mole percent of the diamine and at least 0.1 mole percent of the cuprous compound. The ratio of the hydrolyzable silicon hydride to the alpha-beta-unsaturated olefinic nitrile may be varied within extremely wide limits. However, since the addition reaction involves 1 mole of the hydrolyzable silicon hydride for 1 mole of the alpha-beta-unsaturated olefinic nitrile in the preferred embodiment of the process, equal molar amounts of reactants have been employed.

In carrying out the process, the hydrolyzable silicon hydride, the alpha-beta-unsaturated olefinic nitrile and the components of the multiple component catalyst system are added to the reaction vessel in any order. In general, it is desirable to agitate the reaction mixture to obtain optimum reaction rates.

Generally, the temperature of the reaction mixture varies during the course of the reaction and varies also depending on the particular reactants. The reflux temperature of the reaction is from 50° to about 130° C. In addition to refluxing the reaction mixture under atmospheric conditions, the reaction mixture may be heated at reflux temperature corresponding to reduced pressure or elevated pressures. The reaction may also be carried out in the presence or absence of inert solvents. Preferably, no inert solvent is used in the reaction. Thus, using the Bluestein catalyst, there may be obtained a cyanopolysiloxane of the formula, (8)    $R_a(NCR^3CH_2CH_2)_bSiO_{\frac{4-a-b}{2}}$ where R, $R^3$ and $a$ and $b$ are as defined previously. The polymer of Formula 8 may then be reacted with $H_2$ in the presence of Raney nickel catalyst to change the corresponding cyano groups in the polysiloxane to primary amine groups so that the polymer has the structure of Formula 7. The hydrogenation reaction is preferably carried out at elevated temperatures in the range of 50° C. to 150° C. and for periods of time varying from 1 hour to 10 hours to obtain the desired amine product.

Preparation of the organohydrogenpolysiloxane of Formula 5 which can contain both saturated and olefinically unsaturated hydrocarbon groups may be carried out by any of the procedures well known to those skilled in the art. Such polysiloxanes can be produced by following the procedure involving the hydrolysis of one or more hydrocarbon-substituted chlorosilanes in which the substituents consist of saturated hydrocarbon groups, the crude hydrolyzate cantaining a mixture of linear and cyclic polysiloxanes. Further, one or more hydrocarbon-substituted chlorosilanes with hydrocarbon-substituents comprising one or more olefinically unsaturated hydrocarbon groups are hydrolyzed to produce a crude hydrolyzate containing a mixture of linear and cyclic polysiloxanes. The two crude hydrolyzates are polymerized by being treated with KOH to form mixtures of low boiling, low mloceular weight cyclic polymers mixed with undesirable materials such as monofunctional and trifunctional chlorosilane starting material. The resulting compositions are fractionally distilled and there is collected two pure products of the low boiling, low molecular weight cyclic polymers free of any significant amount of monofunctional and trifuncitonal groups. In order to depolymerize the two hydrolyzates, there is added to them a catalyst and the mixture is heated to a temperature above 150° C. to produce and recover by evaporation a product consisting of low molecular weight cyclic polysiloxanes comprising, for example, about 85% of the tetrasiloxane and 15% of the mixed trisiloxane and pentasiloxane. The distillate consisting essentially of low molecular weight cyclic dimethyl polymers free of any significant amounts of monofunctional and trifunctional groups is collected in the vessel. The then dried cyclic siloxane contains less than 50 parts per million of water. The cyclic methylvinyl and diphenyl cyclic siloxanes are prepared in the same way. The two or more types of cyclic siloxanes are added in the desired proportions in a reaction vessel so as to be subjected to an equilibrium reaction to form the hydrogenpolysiloxanes of Formula 4. Thus, about 2.5 to 17 mole percent cyclic diphenylsiloxane can be added to 83 to 97.5 mole percent dimethyl cyclic siloxanes. If desired, and depending upon the type of compound that is to be produced, 0.1 to 1.0 mole percent of methylvinyl cyclic siloxane may be mixed with dimethyl and diphenyl cyclic siloxanes of other desired proportions of the cyclic siloxanes can be used to produce the desired polymer. To the above mixture of pure cyclic siloxanes there is added a polymerization catalyst such as KOH. The potassium hydroxide breaks a ring of cyclic siloxane to form a potassium silonate, which can then attack other cyclics to break the rings and increase the chain length of the siloxanes formed. There is further added to the reaction mixture in the amount of one or more monofunctional compounds calculated to function as end-blockers for limiting the degree of polymerization and consequently the lengths and molecular weights of the linear polysiloxane chains and for stabilizing the polymers.

Usually a small amount of monofunctional compounds are added to function as end-blockers so as to regulate the chain length of the polymers. The functional compounds there may be employed satisfactorily for controlling polymer growth include, among others, hexamethyldisiloxane, tetramethyldiethoxydisiloxane, diethyltetraethoxydisiloxane, divinyltetraethoxydisiloxane, and deca-methyltetrasiloxane. The equilibration reaction is carried out from 2 to 4 hours until about 85% of the cyclic diorganosiloxanes have been converted to polymer end-stopped with monofunctional groups. When the 85% conversion point has been reached, there are just as many polymers being converted to cyclic siloxanes as there are cyclic siloxanes being converted to the polymers. At that time there is added to the mixture a sufficient amount of an acid donor such as phosphoric acid, that will neutralize the KOH catalyst so as to terminate the polymerization reaction. The cyclic diorganosiloxanes in the reaction mixture are then distilled off to leave the polyhydrogensiloxane which is useful in the present invention. Hydrocarbon-substituted polysiloxanes with pending groups consist largely of groups other than methyl, such as ethyl or the saturated hydrocarbon groups and olefinically unsaturated hydrocarbon groups other than, or in addition in addition to, vinyl groups can be produced by means of procedures similar to those described above or by the means of procedures modified in accordance with the characteristics of the hydrocarbon groups to be included.

The above procedure can be used to produce branch-chain polysiloxanes, as well as linear diorganopolysiloxanes, depending on the reactants that are used in the equilibration reaction.

To produce the hydrogenpolyorganosiloxane of the present case which is used in the SiH-olefin addition reaction and which are represented by the average unit Formula 4, hexamethyldisiloxane is equilibrated with octamethyltetrasiloxane and tetramethyltetrahydrogentetrasiloxane in the proper molar proportions, in the presence of 3% of acid-treated clay, such as 3% acid on fuller's earth and the reaction mixture is heated for 5 hours at 100° to 120° C. to equilibrate the reaction mixture. After 5 hours of reaction time, when approximately 85% of the tetramers have been converted to the polymer polysiloxane, the catalyst is neutralized with a weak base and the volatile cyclics are distilled off to leave a substantially pure polyorganosiloxane. By using dihydrogentetramethyldisiloxane as the chain-stopping unit instead of hexamethyldisiloxane, there can be obtained a linear polysiloxane having hydrogen groups at the terminal positions of the polymer chain, as well as in the center position of the polymer chain. Such a polymer product allows the production of amine-terminated polysiloxanes with the olefinic chloride or olefinic cyanide attached by SiH-olefin addition reaction at the terminal positions of the chain, as well as in the center position of the polymer chain.

Instead of forming the hydrogenpolysiloxane first and then adding it by SiH-olefin addition reaction to an olefinic chloride or olefinic cyanide and then converting the chloride or cyanide to the amino group, the olefinic cyanide may be first added by SiH-olefin addition reaction to a hydrogenchlorosilane using the Bluestein catalyst. The resulting silane may then be hydrolyzed with chlorosilanes to form a mixture of linear and cyclic siloxanes, as well as disiloxanes.

Thus, a hydrogenchlorosilane may be reacted with the olefinic cyanide in the presence of the Blustein catalyst and the resulting cyanoalkylchlorosilane hydrogenated with $H_2$ in the presence of Raney nickel to provide the aminealkylchlorosilane. This silane may then be hydrolyzed by itself or with other chlorosilanes to a crude hydrolyzate of aminealkylsiloxanes, such as disilozane and cyclic polysiloxanes. These cyclic polysiloxanes may then be equilibrated by themselves or with other organopolysiloxanes and chain-stoppers, such as aminoalkyldisiloxanes, to produce the desired polysiloxane of Formula 7.

The polysiloxane products of the present case may also be obtained by equilibrating cyclic polysiloxanes of the formula, (8a) 

with cyclic polysiloxanes of the formula, (8b) 

and a disiloxane chain-stopper of the formula, (8c) 

in the presence of a basic catalyst, such as potassium hydroxide to obtain the desired polysiloxane using the same technology as was used to obtain the hydrogenpolysiloxane of Formula 5, where R, R' are the same as previously defined, M is selected from halogen, CN and $NH_2$, Q is selected from M radicals and R radicals and $w$ is a whole number that varies from 3 to 10. If M is equivalent to CN, then the polysiloxane product is reacted with $H_2$ in the presence of Raney nickel to produce the aminepolysiloxane. If M represents a halogen radical, then the polysiloxane is reacted with ammonia to produce the aminepolysiloxane.

The polysiloxane of Formula 7 which may have primary amine groups in the terminal position of the chain and/or in the center portion of the polymer chain, may then be reacted with different compounds selected from the group of RCl,

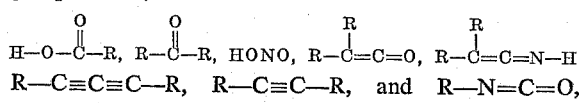

where R is as previously defined, which compounds will react with and add on to the primary amine or to the secondary amine groups which are formed as explained below.

The primary polysiloxane of Formula 7 may be reacted with RCl in the presence of a base and at room temperature to produce a polysiloxane with a secondary amino group having the structure, (9) 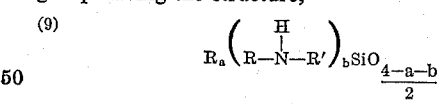

where R, R', $a$ and $b$ are as defined previously.

The primary aminoalkylpolysiloxane of Formula 7 may be reacted with

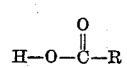

at a reaction temperature range of 10° C. to 150° C. for a period of 1 to 5 hours to added on the acid group to the amine to produce a group of the structure

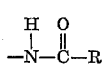

The secondary aminoalkylpolysiloxane of Formula 9 may be reacted with

in the presence of $H_2$ and nickel to produce in the polysiloxane a nitrogen group having the structure

The reaction is preferably conducted at room temperature for a reaction period of 2 to 4 hours.

The secondary aminoalkylpolysiloxane of Formula 9 may be reacted with HONO at room temperature within a reaction time of 1 hour to produce a polysiloxane having a nitrogen group thereon of the structure

The primary aminoalkylpolysiloxane of Formula 7 may be reacted with a compound of the formula

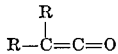

without a catalyst, preferably at room temperature with a reaction period of 1 to 5 hours to produce a polysiloxane having a nitrogen containing group of the structure

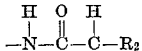

The secondary aminoalkylpolysiloxane of Formula 9 may be reacted with a compound of the formula

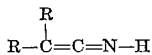

without a catalyst, preferably at elevated temperatures in the range of 75° to 125° C. at a reaction period of 1 to 5 hours to produce a polysiloxane having a nitrogen-containing group of the structure

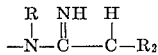

The primary aminoalkylpolysiloxane of Formula 7 may be reacted with a compound of the formula

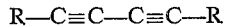

without a catalyst and preferably at room temperature in the reaction time of 1 to 2 hours, to produce a polysiloxane having nitrogen-containing groups of the structure

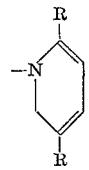

The primary aminoalkylpolysiloxane of Formula 7 may be reacted with a compound of the structure R—C≡C—R without a catalyst and preferably at an elevated temperature of 75° to 125° C. and in a reaction time of 1 to 5 hours to produce a polysiloxane having a nitrogen-containing group of the formula

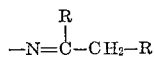

The primary aminoalkylpolysiloxane of Formula 7 may be reacted with a compound of the structure

without a catalyst and preferably at elevated temperatures in the range of 75° to 125° C. and in a reaction time of 1 to 5 hours to produce a polysiloxane having a nitrogen-containing group of the formula

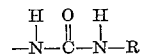

The secondary aminealkylpolysiloxane of Formula 9 may be reacted with H₂C=O at room temperature such that this compound adds on to the secondary amino group to form an intermediate product, which intermediate product is further reacted with

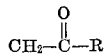

in the presence of a basic catalyst such as potassium hydroxide and at an elevated temperature of 75° to 125° C. for a reaction period of 1 to 4 hours to form a polysiloxane having a nitrogen-containing group of the structure

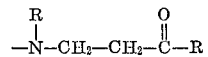

All of the above reactions of the primary or secondary aminoalkylpolysiloxane with the noted compounds above can take place without a solvent. However, one of the commonly used inert solvents may be used in the reaction, such as benzene, toluene, xylene, mineral spirits and others. In the above reactions there is some difference between the reaction temperature and as to whether a catalyst is required. However, with exception of the use of a catalyst, all the reactions proceed in much the same manner. In the reactions, agitation may or may not be used, although agitation is preferred. After the reaction between the aminepolysiloxane and the other compounds indicated above, the resulting nitrogen-containing polysiloxane is separated by methods well known in the art.

The nitrogen-containing polysiloxane of Formula 1, besides having other uses, are eminently suitable as brake fluids. It should be understood that the aminepolysiloxane of the present case can be used as hydraulic fluids in any hydraulic system. In comparison with the brake fluids disclosed in copending patent applications having Ser. Nos. 125,396, 125,397 and 125,398, the nitrogen-containing polysiloxanes have certain distinct advantages as brake fluids over the brake fluids of these copending dockets, as well as the common advantages with the brake fluids disclosed in these dockets identified above. The nitrogen-containing polysiloxanes have lower viscosities at low temperatures, such viscosities being about 400–500 centipoise at −47° F., which is somewhat better than the low temperature viscosities of the other polysiloxane brake fluids. Further, the nitrogen-containing polysiloxanes are more compatible with brake fluids presently on the market than the other polysiloxane brake fluids. In addition, nitrogen-containing polysiloxanes of the present case can dissolve up to 1% by weight of water. This water does not come out of solution and form crystals at low temperatures, such as −40° F. Further, with this amount of water at high temperatures, such as 100° C. or 200° C., the water does not pass out of the polysiloxane and form excessive vapor which can effect the braking action.

Besides the number of other advantages, such as a higher flash point, fire point and auto ignition temperature, as well as much lower water pick-up than the brake fluids presently on the market, the brake fluids of the present case have the advantage that they are paintable, that is, if they are spilled on a portion of the automobile, the fluid will not stain or remove the paint on the surface with which it comes in contact. This is not the case with standard brake fluids which, upon coming into contact with the painted area in an automobile, will either take the paint off or stain it so that the painted area has to be repainted. This advantage is especially pertinent for automobile manufacturers where a large amount of brake fluids are handled and in which cases the brake fluids are quite often spilled on the painted areas of the automobiles. In those cases, the automobiles have to be repainted. However, since the fluids of the present case do not affect the paint, the brake fluid of the present case can be merely wiped off the painted area without any effect whatsoever on the painted area below.

Another advantage of the brake fluids of the present case is that they are non-toxic, that is, they do not give off toxic fumes and do not affect the skin or cause dermatitis of any type or sort. With the brake fluids presently on the market and especially in the case where mechanics and factory workers have to handle large amounts of brake fluids, it is very often the case that the workers develop some sort of dermatitis as a result of contact with the brake fluids.

A dry equilibrium reflux boiling point test is carried out by placing 60 mm. of brake fluid in a flask and boiling under specified equilibrium conditions in a 100 ml. flask. The average temperature of the boiling fluid at the end of the reflux period is determined and corrected for variations of barometric pressure, if necessary, as the equilibrium reflux boiling point. The brake fluids of the present case have an equilibrium reflux boiling point of 550° F. or above.

The next test is the wet equilibration reflux boiling point which is carried out by taking a 100 ml. sample of the brake fluid which is humidified under controlled conditions, then 100 ml. of SAE compatibility fluid is used to establish the end point of the humidification. After humidification, the water content and the equilibrium reflux boiling point of the brake fluid are determined as in the previous test. When my fluid is run under the test conditions set forth above, there is obtained an equilibrium reflux boiling point of 324° to 340° C. or greater, depending upon the rate at which the brake fluid is heated.

For the flash determination, the test is to take a test dish which is filled to a specified level with brake fluid. The fluid temperature is increased rapidly and then at a slower rate as the flash point is approached. At specified intervals, a small test flame is passed across the cup. The lowest temperature at which application of the test flame causes vapors above the fluid surface to ignite is the flash point. The brake fluids of the present invention have a flash point of 275° F. and greater.

If some of the volatiles are stripped off from the brake fluid of the present case, the flash point can be increased to exceedingly higher temperatures.

The procedure to determine the fire point is the same as that for determining the flash point. The fluid is heated and vapor is ignited and the flames passed over the vapor of the fluid until the vapor is ignited and the fluid continues to burn.

To determine the autogeneous ignition temperature, one 125 ml. flask is immersed into a molten lead bath. The temperature of the molten lead bath is continually measured with a thermometer. As the autogeneous ignition temperature is approached, one drop of the fluid is inserted into the flask and the temperature at which spontaneous ignition takes place is the autogeneous ignition temperature. With the fluids of the present case, the fire point is greater than 445° F. and the autogeneous ignition temperature is 775° F. or greater. As mentioned previously, the fire point and the autogeneous ignition temperatures should be considered in order to determine the probability of the brake fluid causing a fire. With the fluids of the present invention, because of their higher flash points and autogeneous ignition temperatures, it is very unlikely that the brake fluid will burn or cause a fire in an automobile because of leaks or a rupture in the brake fluid line.

The brake fluids of the present case have also been subjected to a standard fire test where 40 g. of the brake fluid are placed in a 150 ml. beaker and the beaker then placed in a rotating stage oven which is maintained at 500° F. With the glycol-based fluids, after they have been inserted into the rotating oven for 15 minutes, they burst into flames and continue to burn. Even after the flames have been extinguished and the fluid has again been exposed to oxygen, the glycol-based fluids will immediately ignite and continue to burn. With the fluids of the present case which were subjected to the same test, the fluids survived 12 hours with some vapor loss in the rotating stage oven which was maintained at 500° F., thus showing that the fluids of the present case were considerably more stable and non-combustible at high temperatures.

The kinematic viscosity test is a determination of the measure of the time necessary for a fixed volume of the brake fluid to flow through a calibrated glass capillary viscosimeter under an accurately reproducible head and a closely controlled temperature. The kinematic viscosity is then calculated from the measure of flow time and the calibration constant of the viscosimeter. At −40° C. the brake fluids of this invention have a viscosity of 700 to 1600 centistokes. At 212° F. the brake fluids of the present case have a viscosity that exceeds that of the glycol-based fluids.

In the pH value determination, a quantity of the brake fluid is diluted with an equal volume of a methanol-water solution. The pH is the resulting mixture is measured with a prescribed pH meter assembly at 23° C. For all types of brake fluids, the brake fluids as tested must have a pH of not less than 7 or more than 11.0. A mild base is added to the brake fluids of the present invention such that as measured by the above pH method, the pH of the fluid is 7.2 to 9.6. A mild base that can be added to the fluids of the present case so that they will pass the pH standard test is barium hydroxide.

The brake fluid stability test comprises a high temperature stability test and a chemical stability test. In the case of the high temperature stability test, a 60 mm. sample of the brake fluid is heated to an appropriate holding temperature, and then the brake fluid is maintained at the holding temperature for 120±5 minutes. Then, for the next 5±2 minutes, the fluid is heated to an equilibrium reflux rate of 1 to 2 drops per second and the temperature is taken. The fluids of the present case pass this test.

In the case of chemical stability, 30± 1 ml. of the brake fluid is mixed with 30± 1 ml. of SAE 1 compatibility fluid in a boiling flask. First the initial equilibrium reflux boiling point of the mixture is determined by applying heat to the flask so that the fluid is refluxing at 10±2 minutes at a rate in excess of 1 drop per second. Then over the next 15±1 minute, the reflux rate is adjusted and maintained at 1 to 2 drops per second. This rate is maintained for an additional 2 minutes and the average value is recorded as the final equilibrium reflux boiling point. The brake fluids of the present case also pass this test.

The corrosion test comprises polishing, cleaning and weighing 6 specified metal corrosion test strips and assembling them as prescribed in the standards. This assembly is placed on a standard rubber wheel cylinder cup in a corrosion test jar and immersed in the brake fluid, capped and placed in an oven at 100° C. for 120 hours. Upon removal and cooling, the strips and the fluid cup are examined and tested. The metal test strips are observed to note whether pitting or etching are discernible, whether there are any crystalline deposits which form and adhere to the glass jar walls or the surface of the metal strips, and whether there is sedimentation in the fluid-water mixture. The metal strips are weighed for weight loss and other determinations are made with respect to the test. The brake fluids of the present case pass this test without any difficulty.

Another test was carried out by the present inventor in order to determine the chemical stability of the fluids of the present case as compared to the glycol-based fluids that are available on the market. In the test, 40 g. of each fluid was taken and placed in a 150 mm. beaker and placed in a rotating stage oven which was maintained at 400° F. The high temperature glycol-based fluids were 80% volatilized in 5 hours. The ultra high temperature glycol-based fluids were 30% volatilized in 5 hours and the fluids of the present case were volatilized only 5% in the same number of hours. In a 20 hour period, the high temperature glycol-based fluid was 83% to 84% volatilized. The ultra high temperature glycol-based fluid, in 20 hours, was 75% volatilized and the fluids of the present case were only 13% volatilized, indicating the thermal and chemical stability of the fluids of the present case, as compared to the brake fluids presently on the market.

The fluidity and appearance low temperature test comprises taking brake fluid and lowering it to expected minimum exposure temperatures, such as −40° C. and the fluid is then observed for clarity, gelation, sedimentation, excessive viscosity or thixotropicity. The brake fluid of the present invention with the amount of water that it absorbs from the atmosphere or through osmosis in the hydraulic lines of a brake fluid system absorbs less than 0.5% by weight water and usually less than 0.3% by weight of water. The brake fluid of the present case has no crystallization, cloudiness, stratification or sedimentation and upon reversion of the sample bottle in which the test is carried out, the time required for the air bubble to travel to the top of the fluid is less than 10 seconds. Our fluid passes this test without any difficulty.

In the evaporation test, 25 ml. of brake fluid is placed in a covered dish for 48 hours at 100° C. in an oven. It is then taken out and then returned to the oven for 24 hours at 100° C. and this is continued for a total period of 7 days. The non-volatile portion is measured and examined for residues. The residues are then combined and checked for fluidity at −5° C. In the present case, there is only a loss of 4% by weight of volatiles after the 7 day period.

In the water tolerance test, the brake fluid is diluted with water and stored at low temperatures of −40° C. to −50° C. for 24 hours. The cold water wet fluid is first examined for clarity, stratification and sedimentation and placed in an oven at 60° C. for 24 hours. On the removal, it is again examined for stratification and the volume per cent of sedimentation by centrifuging. The brake fluid of the present case is subjected to this test with the amount of water that normally it would pick up from the atmosphere upon being exposed to the atmosphere for an extended period of time, or the amount of water it would pick up for an extended period, such as several months or a year or more through osmosis through the hydraulic brake lines, assuming that the hydraulic brake lines were immersed in water. This amount of water is less than .3% by weight of the hydraulic brake fluid. As a result, the ester polysiloxane brake fluid of the present case passes this test.

In the compatibility test, a sample of the brake fluid is mixed with an equal volume of SAE 1 compatibility fluid, then tested in the same way as for water tolerance except that the bubble flow time is not measured. The test is an indication of the compatibility of the test fluid with other motor vehicle brake fluids at both high and low temperatures. The polysiloxane brake fluid of the present invention passed this test without any difficulty.

In the resistance to oxidation tests, the brake fluid is activated with approximately 0.2% benzoyl peroxide and 5% water. A corrosion test strip assembly consisting of a cast iron and aluminum strips separated by tin foil squares at each end are then rested in a piece of SBRWC cup so that the test strips are half immersed in the fluid and oven-aged at 70° C. for 166 hours. At the end of this period the metal strips are examined for pitting, etching and weight loss. The polysiloxane brake fluid of the present case, when it was subjected to this oxidation test, passed the test without any difficulty and there was no residue or deposits formed as the result of oxidation.

The next test is the effect on rubber where the four selected SASBRWC rubber cups are measured and their hardness determined. The cups, two to a jar, are immersed in the test brake fluid, one jar is heated for 120 hours at 70° C. and the other for 70 hours at 120° C. After the cups are washed and examined for disintegration, they are remeasured and their hardness redetermined. The polysiloxane brake fluid of the present case passed this test without any difficulty.

The final test is the stroking properties test. In this test, the brake fluid is stroked under controlled conditions at an elevated temperature in a simulated motor vehicle hydraulic brake system consisting of 4 slave wheel cylinders and a master cylinder connected by steel tubing. Standard parts are used. All parts are carefully cleaned, examined and certain measurements made immediately prior to assembly for test. During the test, temperature, rate of pressure rise, maximum pressure and rate of stroke are used as specified. The system is examined periodically during stroking to assure that excessive leakage of fluid is not occurring. Afterwards, the system is torn down, metal parts and rubber cups are examined and remeasured. The brake fluid and any resultant sludge and debris are collected, examined and tested. The polysiloxane brake fluid of the present case also paused this test without any difficulty.

The polysiloxane brake fluid of the present case was also tested in accordance with a Federal test on corrosive instability of light oils. The polysiloxane of the present case was put into a tube and then metal plates on a hanger were placed in a tube such that they were covered with the fluid. A condenser was then placed above the tube and the tube was heated to 200° F. so that reflux could take place and the tube was heated to 200° F. for 168 hours. Then the metal sample plates were taken out, wiped and checked for corrosion and the fluid was checked for deposits or residue or stratification. The polysiloxane brake fluid of the present case also passed this test without any difficulty.

As mentioned previously, the polysiloxane brake fluids of the present case far exceed the specifications of the high temperature glycol-based fluids and the ultra high glycol-based fluids in terms of flash point, in the evaporation test, thermal stability, chemical stability and in other tests. Not only is the polysiloxane brake fluid of the present invention more stable at high temperatures, it has a much lower viscosity than that specified for the best low tempertaure glycol-based fluid presently on the market.

Brake fluids may be prepared according to the present invention which have a viscosity of below 600 centistokes at −40° C. The advantage of this is that there is no sluggishness in the brakes at low temperatures. In fact, the brake fluid of the present invention meets the specifications for arctic brake fluids.

Another advantage of the brake fluid of the present case is its low water hygroscopicity or pick-up from the atmosphere. In fact, the polysiloxane brake fluid of the present invention can be said to repel water rather than to attract it and add it to the polysiloxane mass. In fact, no more than 0.28 weight percent of water is picked up by the polysiloxane brake fluid of the present case when the brake fluid is immersed in a standard brake hydraulic rubber hose which is immersed in a water bath over an extended period of time. The brake fluid of the present invention will pick up even less water from the atmosphere upon being exposed to a humid atmosphere for periods as long as one year or more. With this amount of water moisture, in fact with up to 1.0 weight percent of the polysiloxane as water mixed in with the polysiloxane brake fluid, there is no failure of the brake at extremely low temperatures such as −40° C. and there is no failure of the brake at high temperatures such as 100° C.

Brake fluids presently on the market, that is, glycol-based brake fluids, are notoriously hydroscopic; such brake fluids will pick up from the air large amounts of water, which moisture may cause failure of the brakes at low temperatures or which may cause failure of the brakes at high temperatures.

The following examples are gievn below in order to better illustrate the present invention without intending to limit the invention.

EXAMPLE 1

In to a ½ liter three-necked, round bottom flask equipped with a mechanical stirrer, thermometer, condenser and heating mantle, there is added 0.26 mole potassium hydroxide, 100 parts bis-aminobutyltetramethyldisiloxane and 206 parts octamethyltetrasiloxane. The materials are heated to 185° C. where the equilibration is allowed to progress for four hours. The pot and contents are cooled to 100° C. and sodium bicarbonate is added to neutralize the potassium hydroxide. The neutralization proceeds for one hour at 180° C. The pot is cooled to 120° C. and carbon black and fuller's earth is added to decolorize the fluid and it is filtered through Celite 545. The fluid is stripped at 200° C. and at <1 mm. pressure to yield a structure,

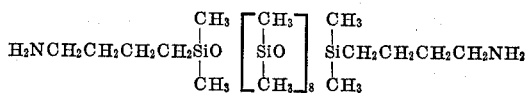

This fluid had the following viscosity properties:

| Viscosity, cs.: | Temperature, ° F. |
|---|---|
| 420 | −67 |
| 14.4 | 77 |
| 11.5 | 100 |
| 4.4 | 210 |

EXAMPLE 2

Into a 500 ml. capacity three-necked, round bottom flask equipped with a mechanical stirrer, thermometer, condenser and heating mantle, there is added 60 parts trimethylethoxysilane and 140 parts γ-aminopropylmethyldimethoxysilane. To this mixture there is added 0.2 part potassium hydroxide in 200 cc. water. The reaction flask is allowed to be stirred at ambient temperatures for 16 hours. After hydrolysis, the organic-siloxane layer is separated from the water and alcohol layer. The siloxane is then dried with anhydrous Na$_2$SO$_4$, filtered and placed in a clean, dry 250 ml. three-necked flask equipped as above. To the siloxane oil there is added 0.2 part potassium hydroxide and the fluid is then equilibrated for 2 hours at 180° C. Once the equilibration is finished, the fluid is then cooled to 100° C. and 3 g. sodium bicarbonate is added to neutralize the base catalyst. The fluid is heated to 180° C. and held there for one hour. Carbon black and fuller's earth are added to decolorize the fluid, which is then filtered through Celite 545.

The resultant fluid has the following structure:

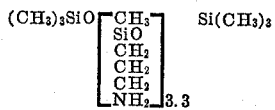

EXAMPLE 3

To a 100 ml. capacity three-necked, round bottom flask equipped with a mechanical stirrer, thermometer, condenser and heating mantle, there is added 11 parts of the aminepolysiloxane of Example 2, 19 parts of the aminepolysiloxane of Example 1 and 0.05 part of potassium hydroxide. The fluid is equilibrated two hours at 385° F. After equilibration, the siloxane polymer is neutralized with 7 parts of sodium bicarbonate at 385° F. for one hour. Once neutralized, the fluid is filtered through fuller's earth and Celite 545.

The resultant fluid has the following structure:

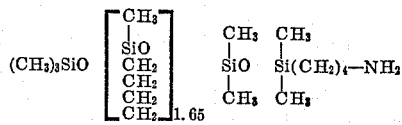

EXAMPLE 4

Twenty parts of isobutylisocyanate is dissolved in 30 parts of diethylether. The isocyanate-ether solution is adedd to a 500 ml. three-necked, round bottom flask equipped with Y-head, addition funnel, dry tubes, condenser, mechanical stirrer, heating mantle and thermometer. To the addition funnel there is added 86.8 parts of

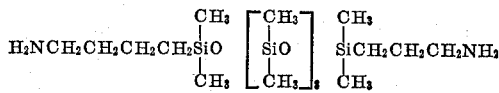

The reaction vessel is stirred rapidly and the aminobutyl fluid is slowly added over an hour period. Once all the aminobutyl fluid is added, the pot is warmed to 40° C. for one hour and then the ether is stripped to 100° C. at 1 mm.

The resultant polymer has the following structure:

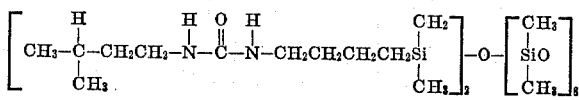

EXAMPLE 5

Into a one liter, three-necked, round bottom flask, equipped with mechanical stirrer, thermometer, dry tube, condenser and heating mantle, there is added 200 parts of

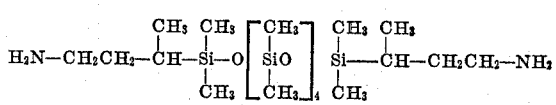

Then there is added one part each of cadmium and zinc acetate as catalysts. The siloxane fluid and catalysts are rapidly stirred and toluene (200 cc.) is added as solvent. Then 70 parts of 2-heptyne was added and the pot refluxed 8 hours at 110° C.–130° C. Upon conclusion of reaction time the solids are filtered out and the fluid is stripped to 151° C. at 3.5 mm. The resultant fluid has the following structure:

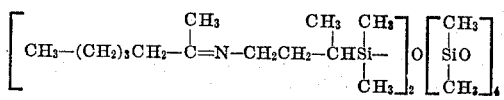

EXAMPLE 6

Into a one liter, three-necked, round bottom flask equipped with mechanical stirrer, thermometer, gas bubbling tube, gas cylinder of ketone and heating mantle, there is added 200 parts of

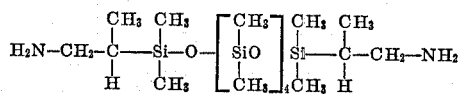

and 200 cc. of anhydrous tetrahydrofuran. To this solution there is added (via the gas bubbling tube) ketone from the gas cylinder at a rate equal to the absorption and reaction of the ketone. The reaction is followed by infrared scans of the samples taken during the run. Once addition is complete, the solvent is removed by stripping to 150° C. at 10 mm.

The resultant fluid has the following structure:

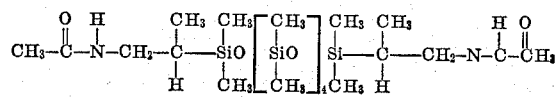

EXAMPLE 7

Into a 1000 ml. three-neck, round bottom flask, equipped with a mechanical stirrer, thermometer, condenser, heating mantle, addition funnel, Y head, and drying tube, there is added 200 parts of

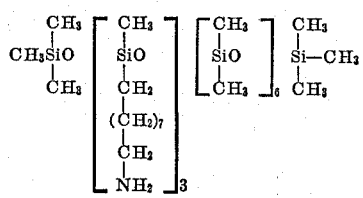

To the amino fluid in the reaction vessel, 100 parts of tetrahydrofuran is added and the vessel is stirred. To the ether and siloxane solution, 170 cc. of a 3 molar butyl lithium solution was added and the pot is warmed to 60° C. until gas evolution ceased. Then 61 parts of isopropylbromide is added to the reaction solution and the pot is heated to reflux for 2 hours. After the refluxing is completed, the solution is filtered through Celite 545 and stripped to 160° C. at 5 mm. to remove all low boiling fragments and solvent.

The final structure of the fluid is:

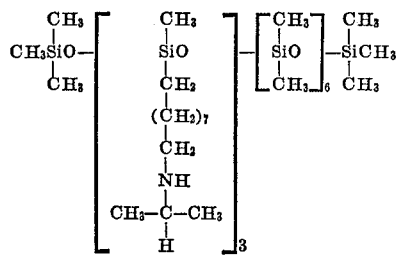

EXAMPLE 8

The brake fluid of Example 1 is subjected to the tests set forth above in the specification for motor vehicle brake fluids. The results obtained from these tests as compared with the highest suggested specifications for brake fluids are set forth in Table I below:

TABLE I.—TEST DATA FOR EXAMPLE 1 FLUID

| Test | Suggested spec. | Example 1 fluid |
|---|---|---|
| E.R.B.P. | >446° F. | >550° F. |
| Wet E.R.B.P. | >320. | 350. |
| Flash point. | >212. | 375. |
| Viscosity: | | |
| −40° C. | >1,800. | 420. |
| 100° C. | >1.5 cc. | 11.5 cc. |
| pH. | 7-11. | 7.2. |
| High temperature stability. | <Δ3.0° C. | Negligible. |
| Chemical stability. | <Δ3.0° C. | Do. |
| Corrosion: | | |
| (a) Metal wt. loss (approx.) | .2 mg. steel. | 0.025 mg. |
|  | .1 mg. aluminum. | 0.017 mg. |
|  | .4 mg. brass, copper. | 0.254 mg. |
| (b) Appearance. | No gelling. | No gelling. |
| (c) Low temperature. | No gelling at 23±5° C. | Do. |
| (d) Deposits. | None. | None. |
| (e) Sediment. | 0.1%. | 0.05%. |
| (f) pH. | 7-11. | 7-11. |
| (g) Rubber hardness. | <15 IRHD. | 16. |
| (h) Rubber swell. | 0.55″. | 0.035″. |
| Fluid appearance at low temperature: | | |
| (a) Clarity. | Clear. | Clear. |
| (b) Crystals. | None. | None. |
| (c) Flow at −40° C. | <10. | 10. |
| Evaporation. | <80%. | 6%. |
| Residue. | Non-abrasive. | None. |
| Residue flow point. | <−5° C. | −10° C. |
| Corrosion test. | | Passed. |
| Oxidation test. | | Do. |
| Stroking properties test. | | Do. |

As can be seen from the test results, the Example 2 brake fluid met the highest requirements and specifications for brake fluid.

I claim:
1. A process for transmitting force from the brake pedal means of a vehicle through hydraulic line means connected to master brake cylinder means and to an activated means comprising substantially filling said hydraulic line means, said master cylinder means, and said activated means with a fluid polysiloxane polymer having the structure,

where R is a monovalent hydrocarbon radical or a halogenated monovalent hydrocarbon radical, R′ is an alkylene radical, E is selected from the group consisting of —NH$_2$,

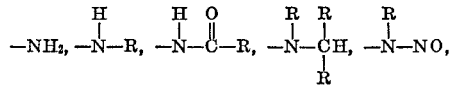

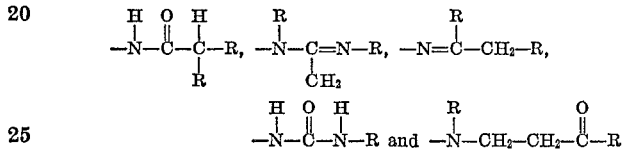

where R is as previously defined and the different R radicals can be the same or different, where $a$ varies from 1.11 to 2.02, $b$ varies from 0.023 to 1.00 and the sum of $a$ plus $b$ varies from 2.024 to 3.00.

2. The process of claim 1 wherein R′ has up to 20 carbon atoms and R is an alkyl radical.

3. The process of claim 1 wherein $a$ varies from 1.23 to 2.05, $b$ varies from 0.055 to 0.92 and the sum of $a$ plus $b$ varies from 2.074 to 2.5.

4. The process of claim 1 wherein the polymer has the structure, $$(E-R'-)R_2SiO(R_2SiO)_{x+y}SiR_2(-R'-E)$$

where $x$ is a whole number varying from 1 to 10 and $y$ is a whole number varying from 1 to 15.

5. The process of claim 4 wherein the polymer has the formula,

[NH$_2$(CH$_2$)$_4$](CH$_3$)$_2$SiO[(CH$_3$)$_2$SiO]$_8$Si(CH$_3$)$_2$[(CH$_2$)$_4$NH]$_2$

References Cited
UNITED STATES PATENTS

| | | | |
|---|---|---|---|
| 3,425,750 | 2/1969 | Deane | 188—352 X |
| 3,046,293 | 7/1962 | Pike | 252—78 X |
| 3,171,851 | 3/1965 | Pepe | 252—78 X |
| 3,317,428 | 5/1967 | Pater | 252—78 X |

LEON D. ROSDOL, Primary Examiner

H. A. PITLICK, Assistant Examiner

U.S. Cl. X.R.

260—448.2 N